(12) United States Patent
Chang et al.

(10) Patent No.: US 10,104,756 B1
(45) Date of Patent: Oct. 16, 2018

(54) LONG LIFETIME PLASMA FLARES BY LASER BREAKDOWN OF AIR WITH INTENSE RF HEATING

(71) Applicant: BAE SYSTEMS Information and Electronic Systems Integration Inc., Nashua, NH (US)

(72) Inventors: Chia-Lie Chang, Potomac, MD (US); Peter A. Budni, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/869,301

(22) Filed: Jan. 12, 2018

(51) Int. Cl.
*H05H 1/46* (2006.01)
*H01S 3/11* (2006.01)
*H01S 3/16* (2006.01)

(52) U.S. Cl.
CPC ............ *H05H 1/46* (2013.01); *H01S 3/11* (2013.01); *H01S 3/1625* (2013.01); *H01S 3/1636* (2013.01); *H05H 2001/4607* (2013.01)

(58) Field of Classification Search
None
See application file for complete search history.

(56) References Cited

U.S. PATENT DOCUMENTS

2008/0025351 A1\* 1/2008 Loesel ............ B23K 26/0622
372/25

\* cited by examiner

*Primary Examiner* — Dedei K Hammond
(74) *Attorney, Agent, or Firm* — Davis & Bujold, PLLC

(57) ABSTRACT

The system and method for creating plasma flares in air by using an ultra-short pulse laser (USPL) that generates plasma filaments with a short lifetime (in nanoseconds), and by heating these plasma filaments with intense microwave (RF) radiation to induce robust air breakdown, resulting in long lifetime (up to milliseconds) plasma flares in the atmosphere.

16 Claims, 2 Drawing Sheets

LONG LIFETIME PLASMA FLARES BY LASER BREAKDOWN OF AIR WITH INTENSE RF HEATING

FIELD OF THE DISCLOSURE

The present disclosure relates to plasma flares and more particularly to forming plasma flares having long lifetimes by heating the plasma flares in air using radio frequency radiation.

BACKGROUND OF THE DISCLOSURE

In the past decade, various experiments have been conducted in an attempt to control the collapse distance of plasma filaments generated by an ultra-short pulsed laser (USPL) propagating in air. In some cases, the collapse distance from the laser can be manipulated with the geometry and the setup of focusing optics. It can also be controlled by temporally chirping the laser pulse.

Plasma filaments generated in air via a USPL could be useful in many potential applications. However, the lifetime of these plasma filaments is very short, typically in the nanoseconds range. The short lifetimes are due to recombination of electrons with ions and, more importantly, the attachment of electrons with oxygen molecules forming $O_2^-$. For example, a 800 nm USPL delivering femtosecond laser pulses at peak power of 3-10 GW range can create a plasma filament with electron number density as high as $4 \times 10^{16}$/cc, initially. At 0.1 nanosecond after the pulse, the recombination process reduces the electron density by an order of magnitude to $4 \times 10^{15}$/cc. And at 10 nanoseconds after the pulse, attachment processes reduce electron density further to the $10^{14}$/cc level, which is more than two orders of magnitude below the initial density value and too fast for many practical applications. Wherefore it is an object of the present disclosure to overcome the above-mentioned shortcomings and drawbacks associated with the prior art plasma generation having short lifetimes, particularly in air.

SUMMARY OF THE DISCLOSURE

One aspect of the present disclosure is a system for generating plasma flares in the atmosphere comprising: an ultra-short pulsed laser configured to deliver laser pulses at a power flux level exceeding a threshold value such as to cause ionization in a beam propagation channel through the atmosphere; a stable plasma filament formed by balancing nonlinear Kerr self-focusing dynamics and plasma defocusing dynamics, the stable plasma filament having an extended length in the beam propagation channel; and a radio frequency source configured to deliver a radio frequency radiation beam directed at the plasma filament such that the radio frequency radiation beam overlaps at least a portion of the stable plasma filament both spatially and temporally thus causing heating of electrons in the plasma filament thereby forming plasma flares in air having a lifetime of a millisecond or more.

One embodiment of the system for generating plasma flares in the atmosphere is wherein the ultra-short pulse laser has wavelengths in the visible and infrared range, and is configured to produce a stable plasma filament in the atmosphere. One embodiment of the system for generating plasma flares in the atmosphere is wherein ionization includes multi-photon and tunneling ionization.

Another embodiment of the system for generating plasma flares in the atmosphere is wherein the radio frequency source has frequencies within a range from 1 MHz to about 20 GHz. In some cases, the radio frequency source delivers electromagnetic waves at a power level sufficient to heat electrons in the plasma filament and create plasma flares. In certain embodiments, the radio frequency source is a high power microwave source.

In another embodiment of the system for generating plasma flares in the atmosphere, the ultra-short pulsed laser is an eye safe laser. In yet another embodiment of the system for generating plasma flares in the atmosphere, the ultra-short pulsed laser is a Ti:Sa laser.

Another aspect of the present disclosure is a method of generating plasma flares in the atmosphere comprising: delivering laser pulses, via an ultra-short pulsed laser, at a power flux level exceeding a threshold value such as to cause ionization in a beam propagation channel through the atmosphere; forming a stable plasma filament by balancing nonlinear Kerr self-focusing dynamics and plasma defocusing dynamics, the stable plasma filament having an extended length in the beam propagation channel; delivering a radio frequency radiation beam directed at the stable plasma filament; overlapping, both spatially and temporally, at least a portion of the stable plasma filament with the radio frequency radiation beam; and heating electrons in the plasma filament to form plasma flares in air having a lifetime of a millisecond or more.

One embodiment of the method of generating plasma flares in the atmosphere of is wherein the ultra-short pulse laser has wavelengths in the visible and infrared range, and is configured to produce a stable plasma filament in the atmosphere. One embodiment of the system for generating plasma flares in the atmosphere is wherein ionization includes multi-photon and tunneling ionization.

Another embedment of the method of generating plasma flares in the atmosphere is wherein the radio frequency source has frequencies within a range from 1 MHz to about 20 GHz. In some cases, the radio frequency source delivers electromagnetic waves at a power level sufficient to heat electrons in the plasma filament and create plasma flares. In certain embodiments, the radio frequency source is a high power microwave source.

In another embodiment of the method of generating plasma flares in the atmosphere, the ultra-short pulsed laser is an eye safe laser. In yet another embodiment of the method of generating plasma flares in the atmosphere, the ultra-short pulsed laser is a Ti:Sa laser.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
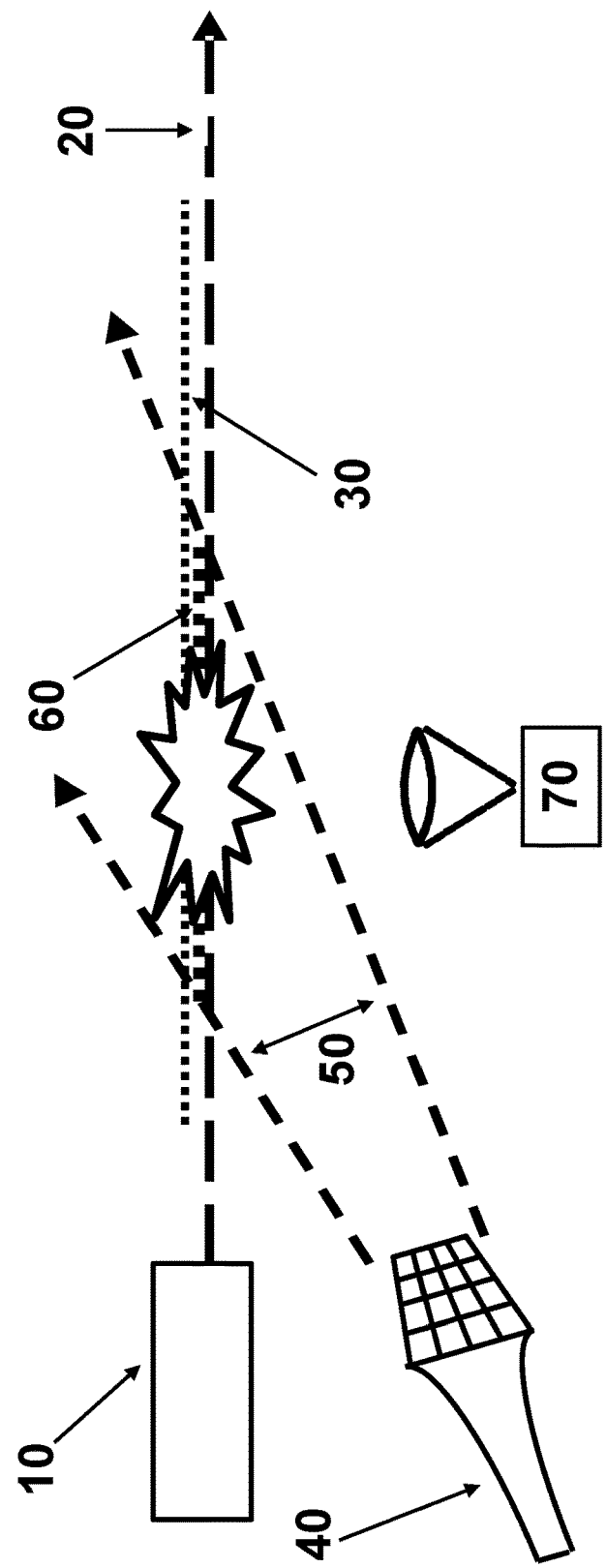
FIG. 1 shows one embodiment of the system of the present disclosure where plasma flares result from heating plasma filaments created by ultra-short pulse lasers with high power microwave radiation.

Ultra-short pulse lasers (USPL) (e.g., Titanium-Sapphire (Ti:Sa) lasers) with femtosecond pulse length and terra-Watt peak power are known to generate plasma filaments in their laser beam propagation channels through the atmosphere (e.g., air) at sea level. These plasma filaments can sometimes be maintained up to a kilometer in length. For laser power exceeding a critical level, typically 3-10 GW, non-linear Kerr effects cause these laser beams to self-focus and collapse, resulting in multi-photon ionization, tunneling ionization, other ionization mechanisms, and plasma generation in the propagation channel. The presence of plasma, however, diffracts the laser beam and prevents its collapse from progressing further. A stable plasma filament is formed when the non-linear, self-focusing effects are balanced by the plasma de-focusing effects in the beam propagation channel.

It has been shown that the lifetime of USPL generated plasma filaments can be extended by imposing an additional laser pulse. The plasma filament lifetime, in some cases, has a duration in the nanosecond range. One technique to extend the lifetime of a plasma filament has been to impose a second laser pulse with long duration onto the plasma channel created by a USPL, in a combined Dual Laser Pulse (DLP) mode of operation. In this approach, the long pulse laser (LPL) provides heating to the electrons in the plasma filament generated by the USPL through inverse bremsstrahlung absorption. As the electron temperature is increased in the filament, the electron-neutral recombination rate is reduced, leading to a prolonged lifetime of the plasma filament.

The dual laser pulse approach was first demonstrated by Applicants in the laboratory by splitting a beam from a Ti:Sa laser in two, where a 30 fs laser pulse after the compressor stage acted as a USPL to create a plasma filament, and a 0.3 ns laser pulse before the compressor stage acted as a LPL to be injected into the plasma channel. When both femtosecond and nanosecond pulses were temporally and spatially overlapped, the lifetime of the plasma filament was extended from nanoseconds to a lifetime on the order of microseconds. It was also found that additional ionization was induced in the plasma channel by the LPL pulse due to the release of electrons attached to neutral oxygen molecules.

The DLP concept of combining femtosecond and nanosecond laser pulses to enhance plasma density in the laser channel was studied with analytic models and computations. The DPL concept was further demonstrated experimentally by the use of different heating lasers at longer pulses acting as LPL to extend the lifetime of plasma filament. In some cases, long-distant microwave transmission through a long live plasma channel, standoff detection of hazardous agents, and lightning control and protection have been envisioned as practical applications for the system of the present disclosure.

In one embodiment of the system of the present disclosure, a Nd:YAG laser at 1064 nm (LPL) was operated with a 3.3 J, 10 ns pulse to heat a plasma filament created by a Ti:Sa laser at 800 nm (USPL) with a 15 mJ and 500 femtosecond pulse. The Nd:TAG laser had a 1 mm diameter and a 10 Hz repetition rate. Intense heating of the LPL caused optical breakdown and avalanche ionization in the plasma channel, generating fragmented plasma bubbles along the channel. The lifetime of these plasma bubbles was about several milliseconds and the plasma density over the channel was enhanced by a factor of 200 when compared to the unheated filament.

Recently, a $CO_2$ laser at 10.6 μm (LPL) was operated with 5 J and 50 ns pulse to trigger an intense plasma spark in the plasma channel, with electron density $>10^{18}$/cc, an electron temperature >10 eV, and a plasma filament lifetime of about 100 μs. The plasma spark occurred at a location where the $CO_2$ laser beam intersected with the plasma filament created by the USPL, generating a loud sonic boom as well as bright optical emissions. The laser propagation channel seemed to be terminated by the emergence of the plasma spark, thus interrupting the formation of any plasma filament beyond that point.

Referring to FIG. 1, one embodiment of the system of the present disclosure is shown. More specifically, a femtosecond ultra-short pulse laser (USPL) 10 delivering high power laser pulses through the air along the propagation path 20 is shown. In one embodiment, the USPL was a Ti:Sa laser. In other embodiments, a laser capable of acting as a plasma seed are used. In some cases lasers having eye-safe wavelengths are preferred as they will not create collateral damage (e.g. retinal damage such as caused by near IR lasers such as 800 nm or 1060 nm). In certain cases, the lasers have wavelength of 1.5 μm, 2 μm, 3-5 μm, 10 μm and the like. These wavelengths can occur via direct emission or via non-linear effects. A plasma seed generator means the laser has sufficient peak power to provide ionization (or some plasma density) in the atmosphere. In some cases, the power flux level exceeds a threshold value such as to cause multi-photon and tunneling ionization, but other ionization mechanisms are also possible. The propagating pulses are self-focused under the nonlinear Kerr effect in air, causing the optical channel to collapse. When the light intensity in the collapsing channel exceeded photoionization and tunneling ionization thresholds, plasma was generated and the optical channel was defocused by the plasma. A dynamic balance between Kerr focusing and plasma defocusing gave rise to thin and long plasma filaments 30 in the optical channel, a process commonly known as "filamentation" in air. It was found that the lifetime of these plasma filaments was very short, about several nanoseconds, due to the recombination of electrons with their parent ions, and the strong attachment to oxygen molecules. Such a short lifetime limits the potential for practical applications.

As mentioned in the previous section, the lifetime of the plasma filaments can be extended by imposing an additional laser pulse on these plasma filaments, thus heating electrons in the plasma through an inverse bremsstrahlung process. As the electron temperature increases (and thus adds kinetic energy to the system), both the electron-ion recombination rate and the electron-neutral attachment rate decrease, leading to a longer plasma lifetime. Moreover, electrons formerly attached to oxygen molecules can be released by the emergence of a heated electron population in the plasma, again increasing the plasma lifetime. The heating pulse can come either from the same laser beam by diverting part of the beam to a different path and then recombining it with the plasma filaments, as described above, or from a second laser of a different wavelength.

Still referring to FIG. 1, the plasma filaments were heated with electromagnetic (EM) waves 50 emitted from a RF source, which is represented by a high power microwave (HPM) source 40. In the region where the beam of EM waves from the RF source overlaps 60 with the plasma filaments 30, electric fields of the EM waves provide collisional heating of the electrons and raise the temperature of the plasma. The physics of electron heating by EM waves for RF source is similar to that of long laser pulses.

The system of the present disclosure ideally uses a heating source in the RF frequency range instead of in the visible/IR frequency range. In the presence of an oscillating electric field in the form of $\sim E \exp(-i\omega t)$, where E is the vector amplitude of the electric field, $\omega$ is the angular frequency of oscillation, and t is time. The electron oscillating velocity V in the atmosphere is governed by the equation $$\frac{dV}{dt} = \frac{qE}{m} - vV \quad (1)$$

where q is electron charge, m is electron mass, and n is electron-neutral collision frequency with air molecules. Assuming $V \sim \exp(-i\omega t)$, the electron oscillating velocity is then $$V = \frac{q}{m} \frac{v + i\omega}{\omega^2 + v^2} E \quad (2)$$

The oscillating electron velocity gives rise to an oscillating current in the form of $$J = NqV = \frac{Nq^2}{m}\left(\frac{v + i\omega}{\omega^2 + v^2}\right)E \quad (3)$$

where N is the electron density in the plasma.

This oscillating current is the source of electron heating, transferring energy from the driving electric field E to the electron population at a rate J·E per unit volume. Based on the principle of energy conservation, the electron temperature T is determined by the source term described above, balanced by the energy loss term due to electron-neutral collisions $$\frac{d}{dt}\left(\frac{3}{2}NT\right) = \text{Re}(J \cdot E) - \frac{3}{2}\sum_k \delta_k v_k N(T - T_k) \quad (4)$$

In this equation, the energy loss term on the right is a summation of neutral species k in the atmosphere, where $\delta_k$ is the average fraction of energy transferred from an electron to a neutral in one collision, $n_k$ is the electron collision frequency with neutrals, and $T_k$ is the neutral temperature. From Eq. (3), the source of electron heating can be further expressed as $$\text{Re}(J \cdot E) = \frac{Nq^2}{m}\left(\frac{v}{\omega^2 + v^2}\right)E^2 \quad (5)$$

where E=|E|, v is electron-neutral collision frequency, N is electron density, and $\omega$ is a $2\pi \times$EM frequency.

At sea level, the total number density of atmospheric molecules $N_n$ is about $2.5 \times 10^{19}$/cc, and is mainly composed of nitrogen gas, $N_2$, at 78% and oxygen gas, $O_2$, at 21%. For electrons at temperature of 300° K, effective electron-neutral collision frequencies are:

$v_{N2}(300° K)=1.8 \times 10^{11}$ Hz $v_{O2}(300° K)=1.3 \times 10^{11}$ Hz $\quad (6)$ When electron temperature is raised to 5000° K via RF heating, the effective electron-neutral collision frequencies are increased to:

$v_{N2}(5000° K)=2.0 \times 10^{12}$ Hz $v_{O2}(5000° K)=9.9 \times 10^{11}$ Hz $\quad (7)$ Therefore, over the range of the electron temperature from 300° K to 5000° K, the effective collision frequency of electrons goes from about 0.3 THz to about 3.0 THz. As mentioned previously, methods of heating plasma filaments created by USPL have used a second laser at longer pulses (LPL) such as a Nd:YAG laser or a $CO_2$ laser. In contrast, the present disclosure is directed to heating plasma filaments with EM waves in the RF frequency domain at or below 20 GHz.

If the plasma filament generated by a USPL is heated with a second laser pulse, such as a Nd:YAG LPL laser at 1064 nm wavelength, the frequency of the heater laser at f~282 THz is much larger than the effective collision frequency, i.e. w=2pf>>n. Likewise, if the LPL is a $CO_2$ laser at 10.6 mm, or at a frequency f~28.3 THz, it is also true that w=2pf>>n. Under such circumstances, the laser source of electron heating can be simplified to $$\text{Re}(J \cdot E)_{LPL} \approx \frac{Nq^2}{m}\left(\frac{v}{\omega_{LPL}^2}\right)E_{LPL}^2 \quad (8)$$

On the other hand, if the plasma filament is heated with RF sources at frequencies f of about 20 GHz or below, as in the present disclosure, the angular frequency of RF is much smaller than the effective collision frequency, i.e. w=2pf>>n. As a result, the RF source of electron heating can be expressed as $$\text{Re}(J \cdot E)_{RF} \approx \frac{Nq^2}{m}\left(\frac{1}{v}\right)E_{RF}^2 \quad (9)$$

This relation shows that the RF heating rate per unit volume depends only on RF power intensity, which can be readily increased with current RF technology, rather than on both power intensity and EM frequency as is the case for laser heating as described in Eq. (8). The major advantage of RF heating versus laser heating can be illustrated by taking the ratio of Eqs. (9) and (8), which is $$\frac{\text{Re}(J \cdot E)_{RF}}{\text{Re}(J \cdot E)_{LPL}} = \left(\frac{\omega_{LPL}^2}{v^2}\right)\left(\frac{E_{RF}^2}{E_{LPL}^2}\right) \quad (10)$$

It is clear from this ratio that, at the same power levels of LPL and RF sources, $E^2_{RF} \sim E^2_{LPL}$, the source strength of RF heating is a factor of $(\omega^2_{LPL}/v^2)$ larger than that of the LPL heating. This enhancement factor is about $3.3 \times 10^7$ for a LPL at 1064 nm and for electrons at 300° K. It is reduced to $3.5 \times 10^5$ for electrons at 5000° K. However, even at such high temperature the enhancement factor is still quite impressive.

For laser heating, $\omega \gg v$ and the laser wavelength $\lambda$ is the driver. The heating source is proportional to $\lambda^2$. But for RF heating, $\omega \ll v$ and the RF wavelength/frequency is not the driver below 20 GHz. Using Eg. (10) to compare RF heating with a laser source, for a $CO_2$ laser at 10.6 μm, $$\left(\frac{\omega_{LPL}^2}{v^2}\right) = 3.2 \times 10^5$$

The RF source at 7 MW/m² at 18 ft. stand-off (e.g., 16-module, 1 GHz, 400 Hz repetition rate) had a RF power flux: 700 W/cm², the in-house $CO_2$ laser had a power flux: 10 MW/cm², but the RF source exceeds power flux of the $CO_2$ laser by a factor of 22.4. However, for the CO2 laser to match the RF performance it must illuminate 1 m² area, at 400 Hz rep. rate, and achieve $$\frac{\text{Re}(J \cdot E)_{RF}}{\text{Re}(J \cdot E)_{LPL}} = 1$$

the CO2 laser has to deliver 17.9 tera-Watt.

And, for a powerful Nd:YAG laser heating source used in the lab, at 1.064 mm, 3.3 J/pulse, 10 ns pulse, 1 mm dia., 10 Hz rep. rate:

$$\left(\frac{\omega_{LPL}^2}{v^2}\right) = 3.5 \times 10^7$$

The Nd:YAG power flux: 33 GW/cm², when compared with RF power flux: 700 W/cm², the Nd:YAG laser achieves the same power flux level as the RF source, but results in:

$$\frac{\text{Re}(J \cdot E)_{RF}}{\text{Re}(J \cdot E)_{LPL}} = 0.7$$

However, for the Nd:YAG laser to match the performance of the RF source: it must illuminate a 1 m² area, increase its repetition rate to 400 Hz, and the Nd:YAG laser has to deliver 1.32 peta-Watt.

The present invention is directed to a very different way of heating plasma filaments generated by an ultra-short pulsed laser (USPL) in the atmosphere, with the intended results of prolonging plasma lifetime, controlling plasma density, tailoring plasma geometry, and creating intense optical emissions and possibly sonic booms in a large section of the plasma filament. Instead of relying on the optical heating pulses delivered by an auxiliary laser such as a long pulsed laser (LPL), the invention is to heat the plasma filament with radio frequency (RF) electromagnetic waves (EM) emitted from a powerful RF source as illustrated by FIG. 1.

In certain embodiments, the RF source is a high power microwave (HPM) source. Other suitable sources can be found at and below 20 GHz frequency range as long as the peak electric fields in the EM radiation are sufficiently high to provide the needed electron heating in extending plasma lifetime to creating optical/IR emissions at levels suitable for intended applications.

Figure 2:
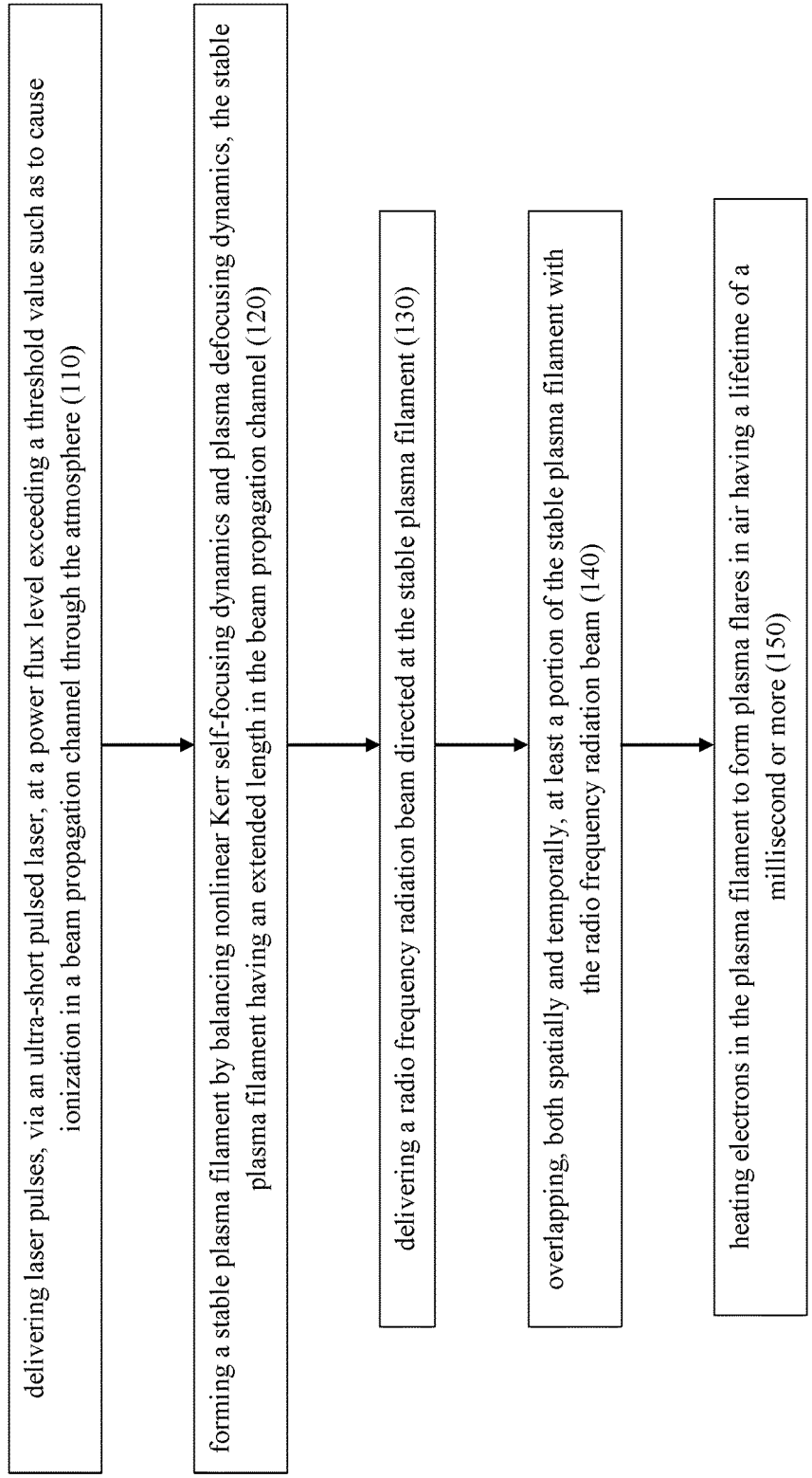
FIG. 2 shows a flowchart of one embodiment of a method of heating plasma filaments created by ultra-short pulse lasers with high power microwave radiation according to the principles of the present disclosure.

Referring to FIG. 2, a flowchart of one embodiment of a method according to the principles of the present disclosure is shown. More specifically, laser pulses are delivered, via an ultra-short pulsed laser, at a power flux level exceeding a threshold value such as to cause ionization in a beam propagation channel through the atmosphere 110. A stable plasma filament is then formed by balancing nonlinear Kerr self-focusing dynamics and plasma defocusing dynamics. The stable plasma filament has an extended length in the beam propagation channel 120. A radio frequency radiation beam is delivered and directed at the stable plasma filament 130. At least a portion of the stable plasma filament is overlapped both spatially and temporally with the radio frequency radiation beam 140. Electrons in the plasma filament are heated to form plasma flares in air having a lifetime of a millisecond or more 150.

One advantage of the system of the present disclosure is that there are many powerful RF sources available at frequencies ranging from MHz to 20 GHz. Another advantage of using radio frequency as the source to heat plasma in the atmosphere is that the heating efficiency is proportional to the square of the heat source's wavelength, up to the wavelength corresponding to 20 GHz radiation. In this regard, a radio frequency source is a much more efficient plasma heater than visible/IR sources.

Still another advantage is that the size and power flux of the a radio frequency beam can be tailored to illuminate a small or a large section of the plasma filament by adjusting antenna gain, thus allowing for more controlled plasma heating processes.

Still another advantage is a large size plasma flare can be created by scanning the ultra-short pulsed laser beam through the broad radio frequency beam column in air, thus forming a diffuse and extensive emissions region formed spatially in three dimensions.

Yet another advantage is that many powerful radio frequency sources are in small size and weight packages that are suitable for mobile and rapid deployment. In certain embodiments, the plasma could be used in countermeasure systems to combat stealth targets, IR sensors, or act as an invisible IR cloak.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for generating plasma flares in the atmosphere comprising:
    an ultra-short pulsed laser configured to deliver laser pulses at a power flux level exceeding a threshold value such as to cause ionization in a beam propagation channel through the atmosphere;
    a stable plasma filament formed by balancing nonlinear Kerr self-focusing dynamics and plasma defocusing dynamics, the stable plasma filament having an extended length in the beam propagation channel; and
    a radio frequency source configured to deliver a radio frequency radiation beam directed at the plasma filament such that the radio frequency radiation beam overlaps at least a portion of the stable plasma filament both spatially and temporally thus causing heating of electrons in the plasma filament thereby forming plasma flares in air having a lifetime of a millisecond or more.

2. The system for generating plasma flares in the atmosphere of claim 1, wherein ionization includes multi-photon and tunneling ionization.

3. The system for generating plasma flares in the atmosphere of claim 1, wherein the ultra-short pulse laser has wavelengths in the visible and infrared range, and is configured to produce a stable plasma filament in the atmosphere.

4. The system for generating plasma flares in the atmosphere of claim 3, wherein the radio frequency source delivers electromagnetic waves at a power level sufficient to heat electrons in the plasma filament and create plasma flares.

5. The system for generating plasma flares in the atmosphere of claim 1, wherein the radio frequency source has frequencies within a range from 1 MHz to about 20 GHz.

6. The system for generating plasma flares in the atmosphere of claim 1, wherein the radio frequency source is a high power microwave source.

7. The system for generating plasma flares in the atmosphere of claim 1, wherein the ultra-short pulsed laser is an eye safe laser.

8. The system for generating plasma flares in the atmosphere of claim 1, wherein the ultra-short pulsed laser is a Ti:Sa laser.

9. A method of generating plasma flares in the atmosphere comprising:
    delivering laser pulses, via an ultra-short pulsed laser, at a power flux level exceeding a threshold value such as to cause ionization in a beam propagation channel through the atmosphere;
    forming a stable plasma filament by balancing nonlinear Kerr self-focusing dynamics and plasma defocusing dynamics, the stable plasma filament having an extended length in the beam propagation channel;
    delivering a radio frequency radiation beam directed at the stable plasma filament;
    overlapping, both spatially and temporally, at least a portion of the stable plasma filament with the radio frequency radiation beam; and
    heating electrons in the plasma filament to form plasma flares in air having a lifetime of a millisecond or more.

10. The method of generating plasma flares in the atmosphere of claim 9, wherein ionization includes multi-photon and tunneling ionization.

11. The method of generating plasma flares in the atmosphere of claim 9, wherein the ultra-short pulse laser has wavelengths in the visible and infrared range, and is configured to produce a stable plasma filament in the atmosphere.

12. The method of generating plasma flares in the atmosphere of claim 9, wherein the radio frequency source has frequencies within a range from 1 MHz to about 20 GHz.

13. The method of generating plasma flares in the atmosphere of claim 9, wherein the radio frequency source delivers electromagnetic waves at a power level sufficient to heat electrons in the plasma filament and create plasma flares.

14. The method of generating plasma flares in the atmosphere of claim 9, wherein the radio frequency source is a high power microwave source.

15. The method of generating plasma flares in the atmosphere of claim 9, wherein the ultra-short pulsed laser is an eye safe laser.

16. The method of generating plasma flares in the atmosphere of claim 9, wherein the ultra-short pulsed laser is a Ti:Sa laser.

* * * * *